US006945158B1

(12) United States Patent
Virtue

(10) Patent No.: US 6,945,158 B1
(45) Date of Patent: Sep. 20, 2005

(54) IRRIGATION SYSTEM

(76) Inventor: Mark Virtue, 4707 E. Taylor Rd., Denair, CA (US) 95316

( * ) Notice: Subject to any disclaimer, the term of this patent is extended or adjusted under 35 U.S.C. 154(b) by 119 days.

(21) Appl. No.: 10/277,132

(22) Filed: Oct. 21, 2002

(51) Int. Cl.[7] ............................................. C12G 1/06
(52) U.S. Cl. ...................... 99/277.2; 285/276; 285/281
(58) Field of Search ........................... 99/277.1, 277.2, 99/277; 285/276, 281, 98

(56) References Cited

U.S. PATENT DOCUMENTS

| | | | |
|---|---|---|---|
| 616,032 A | 12/1898 | Struhs | |
| 912,493 A | 2/1909 | Sanders | |
| 1,447,305 A | 3/1923 | Hauk | |
| 2,833,568 A * | 5/1958 | Corsette | ...................... 285/281 |
| 2,836,439 A | 5/1958 | Moore | |
| 3,478,669 A | 11/1969 | Lanes | |
| 3,512,540 A * | 5/1970 | Hughes | .................. 134/167 R |
| 3,823,655 A | 7/1974 | Potter | |
| 3,871,272 A * | 3/1975 | Melandri | ...................... 99/276 |
| 4,296,952 A | 10/1981 | McCracken | |
| 4,711,785 A | 12/1987 | Bruch | |
| 4,817,995 A | 4/1989 | Deubler et al. | |
| 4,969,391 A | 11/1990 | Haulot | |
| 5,165,734 A | 11/1992 | Smith | |
| 5,609,174 A * | 3/1997 | Ferguson | .................... 134/180 |

* cited by examiner

Primary Examiner—Reginald L. Alexander
(74) Attorney, Agent, or Firm—Michael I Kroll

(57) ABSTRACT

A rotary joint to be used in the irrigation of a wine cap layer within a fermentation tank during a fermenting process. The rotary joint has two sets of ball bearings. The dual sets of ball bearings grants greater support, stability, and mobility to a cantilevered arm that is attached to an end of the rotary joint. The rotary joint includes a first section having a first raceway, a second section having a second raceway, and third section having a third raceway. The first set of ball bearings is positioned on the second raceway and between the first and second raceways. The second set of ball bearings is positioned on the third raceway and between the second and third raceways. The second section is positioned within the third section. The first and third section are secured together with the second section positioned therebetween. A supply line is connected to the first section for providing wine to the rotary joint and a single cantilevered arm is connected to said second section for receiving the wine and dispersing the wine within the fermenting tank.

6 Claims, 12 Drawing Sheets

IRRIGATION SYSTEM

BACKGROUND OF THE INVENTION

1. Field of the Invention

The present invention relates generally to nozzles and, more specifically, to a rotary joint assembly for use in an irrigator, such as in the wine industry, for spreading clear wine taken from the middle of a fermenting must over the cap. The cap is formed during fermentation when skins of the grapes separate from the juice and seeds. The seeds fall to the bottom, the juice stays in the middle and the skins rise to the surface. The skins contain valuable color and flavor qualities. The cap layer becomes dry without moisture being passed thereover and without an irrigator spreading wine over the cap, the wine is deprived of important color, flavor, and minerals.

2. Description of the Prior Art

Conventional rotary joints are produced with a single row of ball bearings that requires the rotary joint to have balanced divergent arms with the rotary joint in the center. In order for the prior art rotary joint to provide the necessary coverage, the arms must have a length substantially equal to a radius of the tank.

A known method of irrigating the cap layer of the must is depicted in FIGS. 1 and 2. FIG. 1 shows a prior art mechanism for irrigating the cap layer of a must. This figure shows a tank 16 having a wine must therein. A cap layer 20 is positioned atop the wine must layer 22. In order to irrigate the cap layer 20, the tank 16 has a wide opening 18. This wide opening 18 is necessary to allow an irrigator having a first arm 13 and a second arm 15 to extend therethrough and into the tank 16. The first arm 13 and second arm 15 are connected to a supply line 17 by a single ball bearing rotary joint 11. The first arm 13 and second arm 15 are required when using the single ball bearing rotary joint 11 for balance to be created thereby allowing for proper irrigation.

An enlarged view of single row of ball bearings 24 taken from within the circle labeled 2 of FIG. 1 is shown in FIG. 2. The wine in the tank 16 is irrigated by wine 22 passing through the supply line 17 and flowing through the single ball bearing rotary joint 11. Upon passing through the single ball bearing rotary joint 11, the flow of wine 12 is divided between the first irrigating arm 13 and the second irrigating arm 15. The wine 12 passing through the first and second irrigating arms is dispersed atop the cap layer 20.

Numerous are other rotary joint device designed for dispersing liquids. Typical of these are U.S. Pat. Nos. 616,032; 912,493; 1,447,305; 2,836,439; 3,478,669; 3,823,655; 3,871,272; 4,296,952; 4,711,785; 4,817,955; 4,969,391; and 5,165,734.

While these nozzles may be suitable for the purposes for which they were designed, they would not be as suitable for the purposes of the present invention, as hereinafter described.

U.S. Pat. No. 616,032
Inventor: Frank Struhs
Issued: Dec. 13, 1898

Shown is a lawn sprinkler coupled to a support, the coupling having an upper enlarged end with an annular recess within the same, a nozzle provided with a projecting flange seated within the recess and having an upwardely-projecting annular nozzle and engaging the coupling, a washer located within the cap and having a recess which receives the ridge on the flange of the nozzle, and a bent nipple forming the terminal portion of the nozzle and adjustable with respect to the other part thereof, substantially as shown and described.

U.S. Pat. No. 912,493
Inventor: Russell C. Sanders
Issued: Feb. 16, 1909

Shown is a lawn sprinkler having a right angled body with horizontal and vertical branches, the vertical branch being provided with radiating nipples having threaded sockets, curved legs screwed into said sockets, cross bars uniting said legs, runners uniting said cross bars and formed with upturned ends, an upright bearing bracket upon the cross bar at the upturned end of said runners, a hose pipe arranged in said bearing bracket and connected to the horizontal branch of the body, a stationary head upon the vertical branch of said body, a rotary head in said stationary head and a curved discharge pipe or nozzle carried by said rotary head, substantially as set forth.

U.S. Pat. No. 1,447,305
Inventor: Joseph Hauk
Issued: Mar. 6, 1923

The invention as shown in a dish-washing machine, the combination of a receptacle, a dish carrying basket mounted therein, a nozzle directing washing fluid upon the dishes in said basket, a discharge spout at the bottom of the receptacle, a support, a pair of fluid supply tanks mounted on said support and movable so that one or the other may be disposed below the spout, a motor-driven pump mounted on the machine, piping connecting said pump with said tanks, a valve in said piping controlling the flow of fluid from either one of said tanks to said pump, and piping from said pump to said nozzle to conduct the fluid under pressure to the same.

U.S. Pat. No. 2,836,439
Inventor: Frank M. Moore
Issued: May 27, 1958

Disclosed is a revolving joint having a housing having a chamber therein and an opening into the chamber; a first carbon bearing adjacent the opening and a second carbon bearing fixed in the chamber and spaced from the first bearing; a sleeve extending through the opening and into the chamber and rotatably carried in said bearings; a collar sealingly engaging the outer surface of the sleeve intermediate said bearings and having a first sealing surface lying in a plane normal to the axis of the sleeve; means formed in the housing defining an annular segmentally spherical second sealing surface surrounding said sleeve intermediate said bearings and facing the collar; an annular sealing ring disposed between and engaging the sealing surfaces; the portions of the ring engaging each of said sealing surfaces being complementary thereto; a spring surrounding the sleeve and bearing at one end against the second bearing and at its other end against the collar to urge said sealing surfaces into sealing engagement with the ring, the contacting surfaces of the ring and the sealing surfaces being smooth and free of discontinuities to permit both rotational and pivotal movement of the sleeve relative to the housing without disengaging the contacting surfaces from said sealing surfaces, said housing having an annular chamber portion therein surrounding the spring, collar and ring, with the ring having an inner diameter greater than the outer diameter of the sleeve and having an outer diameter less than the diameter of said annular chamber portion.

U.S. Pat. No. 3,478,669
Inventor: Jacques P. H. Lanes
Issued: Nov. 18, 1969

The invention discloses an apparatus for the fermentation of crushed grapes comprising a vertically positioned fermentation tank, having a top portion, closed body and a cylindrical portion intermediate said top and bottom, a conduit for introducing crushed grapes into the lower portion of said tank, means for washing the cap formed at the top portion of said tank thereby extracting wine soluble constituents thereof to enhance the quality of said wine, first conduit means in the cylindrical portion of said tank for withdrawing wine therefrom, said conduit means including a recycle conduit in communication with the upper portion of said tank and injector means adaptable to be vertically reciprocated within the upper portion of said tank at a predetermined level in said cap formed therein.

U.S. Pat. No. 3,823,655
Inventor: Ronald A. Potter
Issued: Jul. 16, 1974

The invention discloses an apparatus adapted for use in wine making, and functioning at least partly in the process of making red and white wines, and comprising a vessel including at least a sidewall, a downwardly convergent floor having an opening permitting the removal of the residual grape skins, a door normally closing the opening, means permitting the insertion of raw materials and at least one means permitting the removal of the processed grape juice.

U.S. Pat. No. 3,871,272
Inventor: Rino Melandri
Issued: Mar. 18, 1975

The invention discloses a wine making process comprising the maceration stage taking place at an intensive rate, due to the continuous and violent recycling of the must over the pressed grape dregs. The plant for carrying out the process comprises a vat; a torque flow pump connected by means of a pipe provided with a valve, to the base of the vat; a sprayer with the differentiated arms, rotating by reaction, situated in the top part of the vat and connected to the pump outlet.

U.S. Pat. No. 4,296,952
Inventor: Donald G. McCracken
Issued: Oct. 27, 1981

A rotary joint utilizing a single anti-friction bearing interposed between the static and dynamic components wherein a self-aligning or floating seal is utilized to maintain effective sealing in the event of misalignment. The rotary joint includes a bearing supported sleeve to which a conduit adapter may be affixed in such a manner to mount and locate the bearing on the sleeve, and the components are economically manufactured wherein a dependable and efficient rotary joint may be produced at low cost.

U.S. Pat. No. 4,711,785
Inventor: Guy Bruch
Issued: Dec. 8, 1987

A vinification process for the manufacture of wine or wine products in a vat. A must comprising a liquid phase and solid component forming the main part of a hat coming to the upper level of the liquid phase is introduced into the vat. At least a portion of liquid phase during the fermentation is extracted. The liquid phase is thermally treated by exchanging selectively thermal energy with respect to the extracted liquid. After thermal treatment, the thermal treated liquid phase is reinserted at a selected point with respect to the liquid phase level of the vat. The temperature of the liquid phase is measured at selected points in said vat. The thermal exchange with the extracted liquid phase is controlled over a period of time as a function of the measured temperatures to create a desired temperature gradient of the liquid phase in the vat and a desired temperature evolution as, a function of time, whereby a wine of desired quality is produced.

U.S. Pat. No. 4,817,995
Inventor: Louis H. Deubler et al.
Issued: Apr. 4, 1989

A rotating union including a seal assembly having a rotating seal member removably mounted in the rotor, a non-rotating floating seal member mounted in the housing of the union and keyed thereto to prevent rotation within the housing, and a bias assembly maintaining seal surfaces of the two seal members in engagement. In one embodiment, the combination of materials for the seal members provides a silicon carbide to carbon graphite seal.

U.S. Pat. No. 4,969,391
Inventor: Olivier Haulot
Issued: Nov. 13, 1990

Wine-making vat comprising a lower fermentation vat (1) and an upper tun (2) and at least one valve (20) putting the fermentation vat (1) and the tun (2) in communication automatically and cyclically, and also comprising a fixed unit fitted on a washing port (4) and forming a valve seat, a movable assembly moving vertically and interacting with valve seat, a movable float, a seal between the movable assembly and the movable float, and an arrangement for retaining the movable assembly on the valve seat.

U.S. Pat. No. 5,165,734
Inventor: Walter W. Smith
Issued: Nov. 24, 1992

The conduit swivel connector consists of a first conduit, adapted to be connected for example to a filler hose, and terminating in a bell-like housing within which resides a nipple with ball bearing rotation permitted between the two. Thus a pair of aligned conduits are provided with relative 360 degree rotation between the nipple and the housing. Leakage of fluid being transmitted through the connector is prevented by a series of sealing faces, one being located on a annular sealing member retained in the housing, which cooperates with a corresponding sealing face on an intermediate floating seal ring. The opposite side of the seal ring is provided also with a sealing face that engages in sealing sliding engagement with an annular face on the end of the nipple. The sealing faces are carefully lapped so that leakage is substantially prevented from the interior of the conduits.

SUMMARY OF THE PRESENT INVENTION

The present invention relates generally to nozzles and, more specifically, to a rotary joint assembly for use in an irrigator, such as in the wine industry for spreading clear wine taken from the middle of a fermenting must over the cap. The cap is formed during fermentation when skins of the grapes separate from the juice and seeds. The seeds fall to the bottom, the juice stays in the middle and the skins rise to the surface. The skins contain valuable color and flavor qualities. The cap or top becomes dry without moisture being passed thereover and without an irrigator spreading wine over the cap, the wine is deprived of important color, flavor, and minerals.

A primary object of the present invention is to provide an irrigation system for use in fermenting tanks which overcomes the shortcomings of the prior art.

Another object of the present invention is to provide an irrigation system having a rotary joint with two spaced apart rows of ball bearings.

Another object of the present invention is to provide an irrigation system that does not require dispersing arms to be balanced against one another.

Yet another object of the present invention is to provide an irrigation system for use in fermenting tanks having a single cantilevered arm for dispensing fluid therefrom.

Still yet another object of the present invention is to provide an irrigation system having spaces around the ball bearing raceway whereby the liquid of the fermentation passing therethrough is used to lubricate and clean the ball bearings.

Another object of the present invention is to provide an irrigation system having dual rows of ball bearings supporting a cantilevered arm thereby allowing the access port to the fermenting tanks to be reduced in size.

Still another object of the present invention is provide an irrigation system having dual rows of ball bearings for supporting a single cantilevered arm capable of fully irrigating the cap of the fermented must.

Yet another object of the present invention is to provide an irrigation system that is economical in cost to manufacture and maintain.

An even further object of the present invention is to provide an irrigation system having a rotary arm that is simple and easy to use.

Additional objects of the present invention will appear as the description proceeds.

The present invention overcomes the shortcomings of the prior art by providing an irrigation system having a rotary joint assembly with dual rows of spaced apart ball bearings able to support a single cantilevered conduit terminating in a nozzle for dispensing wine taken from the middle of a fermenting tank over a cap layer within the tank. The cap layer is formed during fermentation when the skins of the grapes separate from the juice and seeds. The seeds fall to the bottom of the tank, the juice stays in a middle layer and the skins rise to the surface. The skins contain valuable color and flavor qualities. The cap or top becomes dry without moisture passing thereover, therefore an irragator is used to spread wine over the cap in order to replenish the wine with color, flavor, and minerals.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
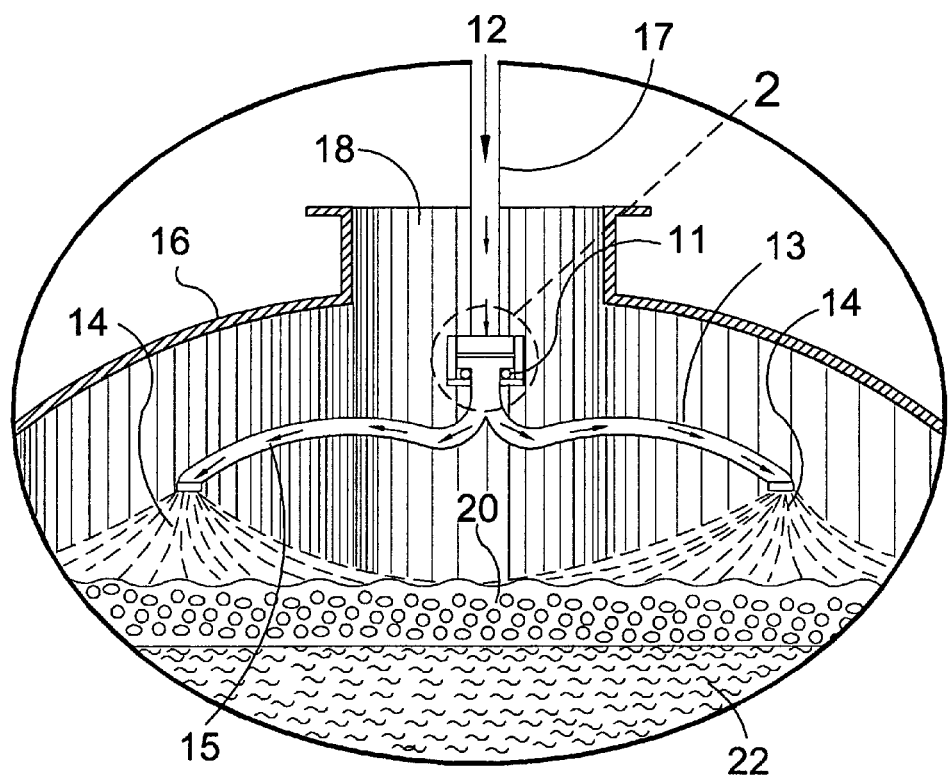
FIG. 1 is an illustrative view of a conventional rotary joint having a single set of ball bearings irrigating the cap layer of a fermented must using a balanced design.

Turning now descriptively to the drawings, in which similar reference characters denote similar elements throughout the several views, the Figures illustrate the irrigation system. With regard to the reference numerals used, the following numbering is used throughout the various drawing figures.

10 Irrigation System
11 prior art rotary joint assembly
12 supply tube
13 first arm
14 wine out
15 second arm
16 tank
17 supply line
18 wide tank opening
20 cap
22 wine
24 single set of ball bearings
28 narrow tank opening
30 single cantilevered arm
32 first set of ball bearings
34 second set of ball bearings
36 first section
38 rotary joint
40 second section
44 first raceway
46 second raceway
48 third section
50 third raceway
52 bottom side of second raceway

DETAILED DESCRIPTION OF THE PREFERRED EMBODIMENT

The following discussion describes in detail one embodiment of the invention. This discussion should not be construed, however, as limiting the invention to those particular embodiments. Practitioners skilled in the art will recognize numerous other embodiments as well. For definition of the complete scope of the invention, the reader is directed to the appended claims.

Turning now to the drawings, in which similar reference characters denote similar elements throughout the several view, FIGS. 3–12 illustrate the irrigation system of the present invention indicated generally by the numeral 10.

In the wine industry it is commonly known that a cap layer 20 is formed in a fermentation tank 16 whereby skins, after separating from grapes, rise to the top of the fermentation tank. The seeds fall to the bottom forming a bottom layer (not shown), the juice stays in the middle to form a middle layer 22, and the skins rise to the surface forming the cap layer 20. The cap layer 20 provides many important qualities to the wine including, color, flavor, and minerals. If the cap layer 20 is allowed to dry out, these elements will be absent from the wine and the resulting wine will prove to be unsatisfactory. An irrigation system 10 is used for taking clear wine taken from the middle of the fermenting "must" (a combination of juice, seeds and skins) and spreading the wine over the cap layer 20.

FIG. 1 is an illustrative view of a conventional irrigation system including a single ball bearing rotary joint irrigating the cap layer 20 of fermented grapes. FIG. 1 shows a tank 16 having a wide opening 18. This wide opening 18 is necessary to allow an irrigator having a first arm 13 and a second arm 15 to extend therethrough and into the tank 16. The first arm 13 and second arm 15 are connected to a supply line 17 by a single ball bearing rotary joint 11. The first arm 13 and second arm 15 are required when using the single ball bearing rotary joint 11 for balance to be created and thereby allowing for proper irrigation.

Figure 2:
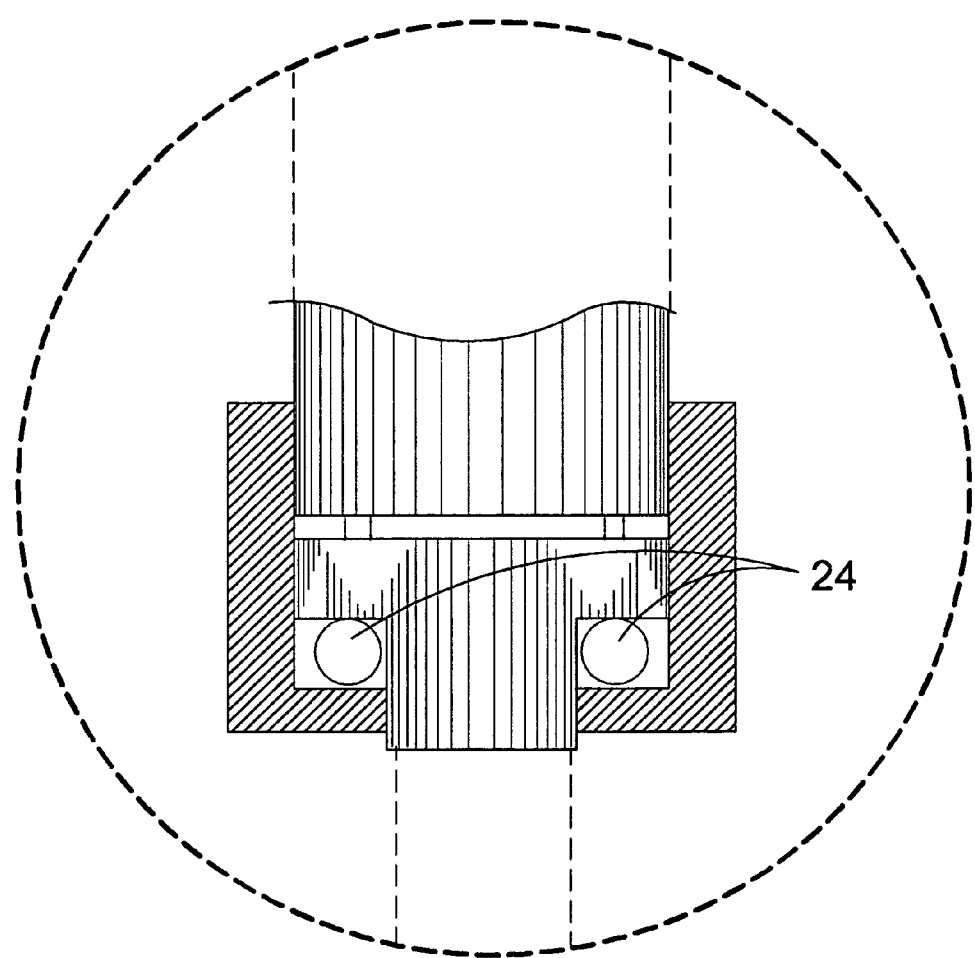
FIG. 2 is an enlarged cross-sectional view the conventional rotary joint having a single set of ball bearings taken from within the circle labeled 2 in FIG. 1.

FIG. 2 is an exploded view of a conventional irrigation system including a rotary joints made with a single set of ball bearings 24 taken from within the circle labeled 2 in FIG. 1. The single set of ball bearings 24 requires that the rotary joint include first and second irrigation arms positioned to balance each other. The balanced design requires the two arms to extend a substantially equal length from the center of the rotary joint. The two armed design of conventional irrigators requires the fermentation tank 16 to have a large opening 18 thereby allowing both the first and second arms 13, 15 to fit into the tank 16.

Figure 3:
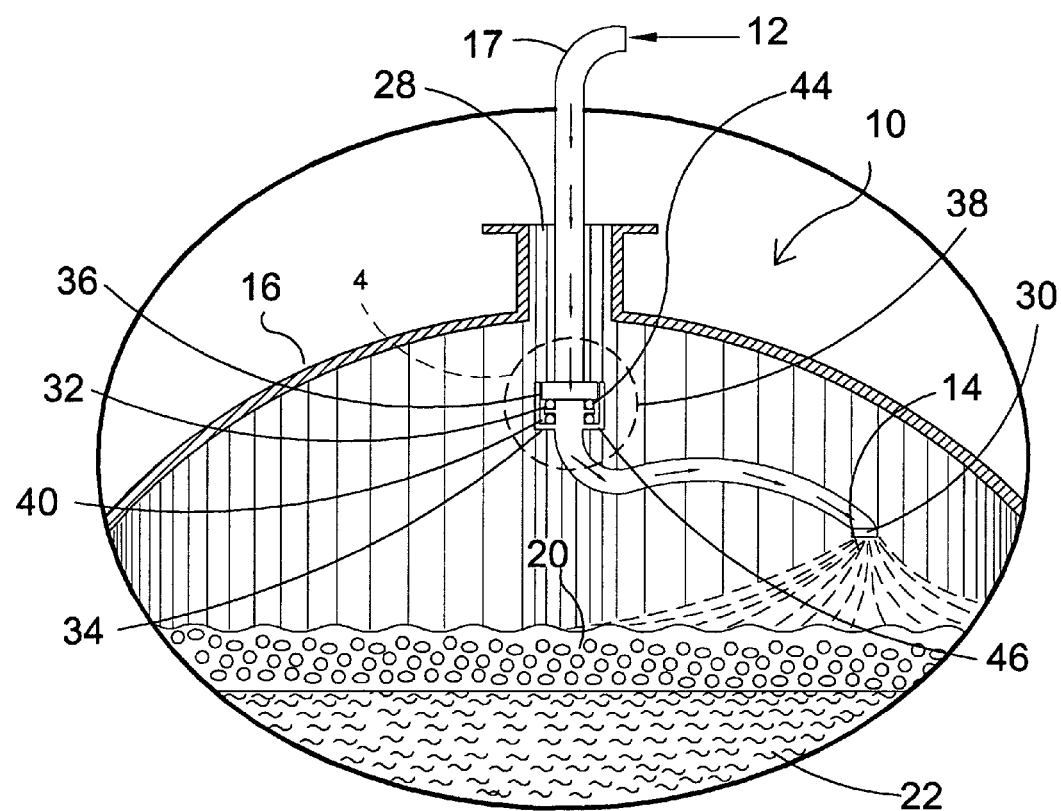
FIG. 3 is an illustrative view of the irrigation system of the present invention irrigating the cap layer in the wine fermentation process.

FIG. 3 is an illustrative view of the irrigator 10 of the present invention irrigating the cap layer 20 during the wine fermentation process. The irrigator 10 of the present invention extends through a narrow access port 28 and into the fermentation tank 16. During the fermentation process a wine layer 22 forms beneath a cap layer 20 within the tank 16. The irrigator 10 includes a rotary joint 38 having a first section 36 and a second section 40 connected thereto. A first raceway 44 extends around a periphery of the first section 36. A second raceway 46 extends around a periphery of the second section 40. A first set of ball bearings 32 is positioned within the first raceway 44 and a second set of ball bearings 34 is positioned within the second raceway 46. A supply tube 12 is connected to the first section 36 of the rotary joint 38. Extending from an end of the second section 42, opposite the connection with the first section 36, of the irrigator 10 is a single cantilevered arm 30. The single cantilevered arm 30 extends over the cap layer 20 and has a second end opposite the connection to the second section 40 through which wine is dispensed.

The irrigator 10 includes the supply tube 12 for providing wine for dispersement over the cap layer 20. The supply tube 12 is connected to the first section 36 of the rotary joint 38. The cantilevered arm 30 is connected to the second section 40 of the rotary joint 38. The supply tube 12 supplies irrigating wine 22 through the irrigator 10 to the single cantilevered arm 30 for distributing the wine atop the cap layer 20. The irrigating wine 22 passes through the cantilevered arm 30 to the output port 14, where it is dispersed onto the cap layer 20. Upon passing through the rotary joint 38, the wine 20 passes over and around the first and second set of ball bearings 32,34. The wine 22 cleans and lubricates the first and second set of ball bearings 32,34 which increases the mobility of the cantilevered arm 30 and increases the efficacy with which the wine 22 is dispersed and used to irrigate the cap layer 20. Upon being dispersed to the cap layer 20, the wine replenishes the cap layer 20 with the various elements of flavor, color, and minerals that were lost earlier in the fermentation process upon separation of the skins of the grapes from the juice and seeds. The wine passing through the rotary joint 38 also functions to lubricate and clean the first and second set of ball bearings 32, 34 of the rotary joint 38.

Figure 4:
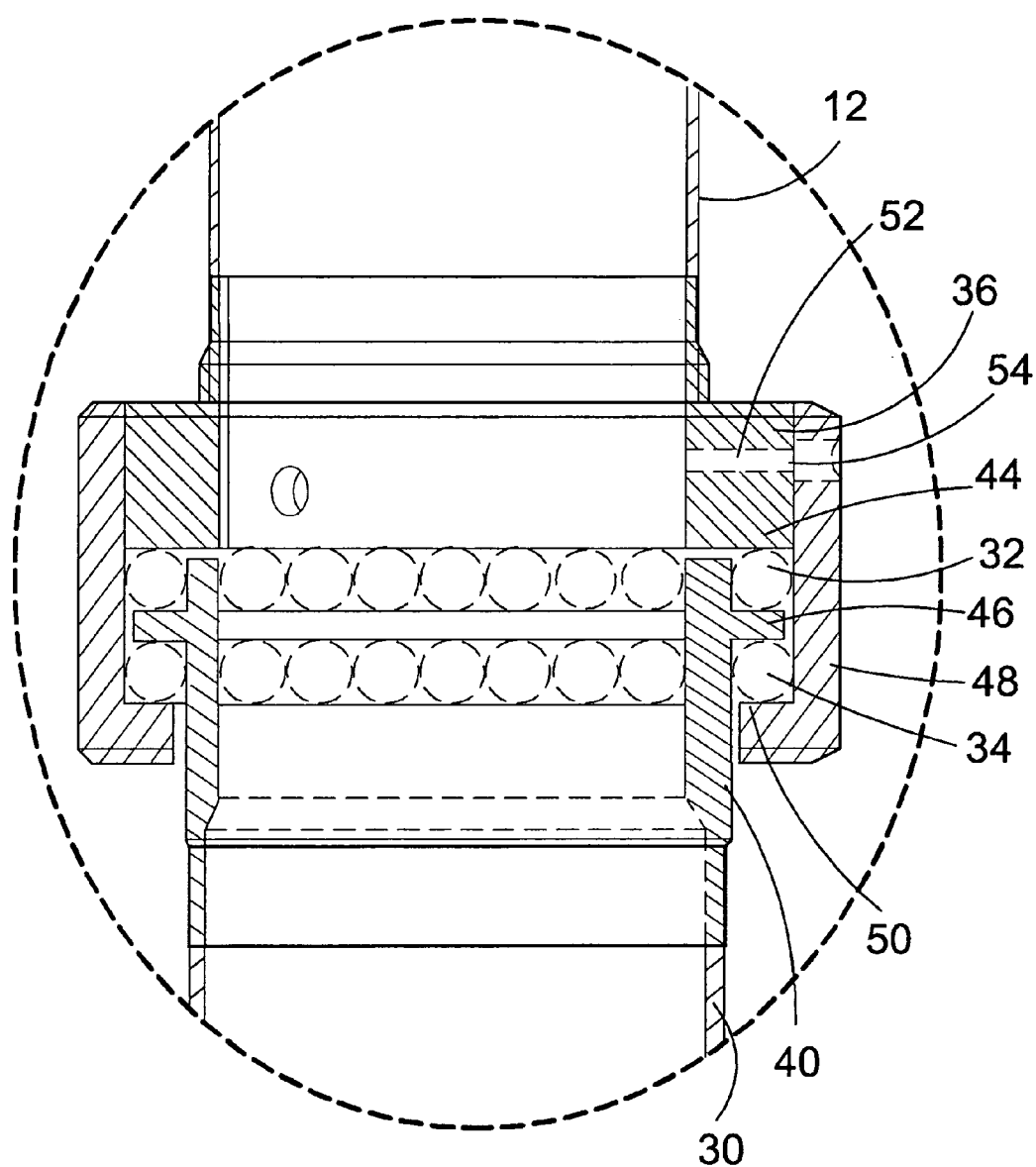
FIG. 4 is an enlarged cross-sectional view of the dual ball bearing rotary joint of the irrigation system of present invention taken from within the circle labeled 4 in FIG. 3.

FIG. 4 is an enlarged cross-sectional view of the rotary joint 38 of the present invention. The rotary joint 38 includes the first section 36, second section 40, an third section 48, and first and second sets of ball bearings 32,34. The first section 36 includes the first raceway 44 extending around a periphery thereof. The section section 40 includes the second raceway 46 extending around a periphery thereof. The first set of ball bearings 32 rests on the second raceway 46 and between the first and second raceways. The third section 48 includes a third raceway 50. The second set of ball bearings 34 are positioned on the third raceway 50 and between the third raceway and a bottom side 52 of the second raceway 46. The first section 36 and the third section 48 are secured together via a connection device 32 when the first section 36 is positioned atop the second section 40. Once secured togther, the supply tube 12 is connected the first section 36 and a cantilevered arm 30 is connected to the second section 40 of the rotary joint 38. The dual ball bearing rotary joint 38 provides extra support and mobility for the single cantilevered arm 30 for dispersing the wine onto the cap layer 20 and thereby replenishing any elements lost in the separation process.

Figure 5:
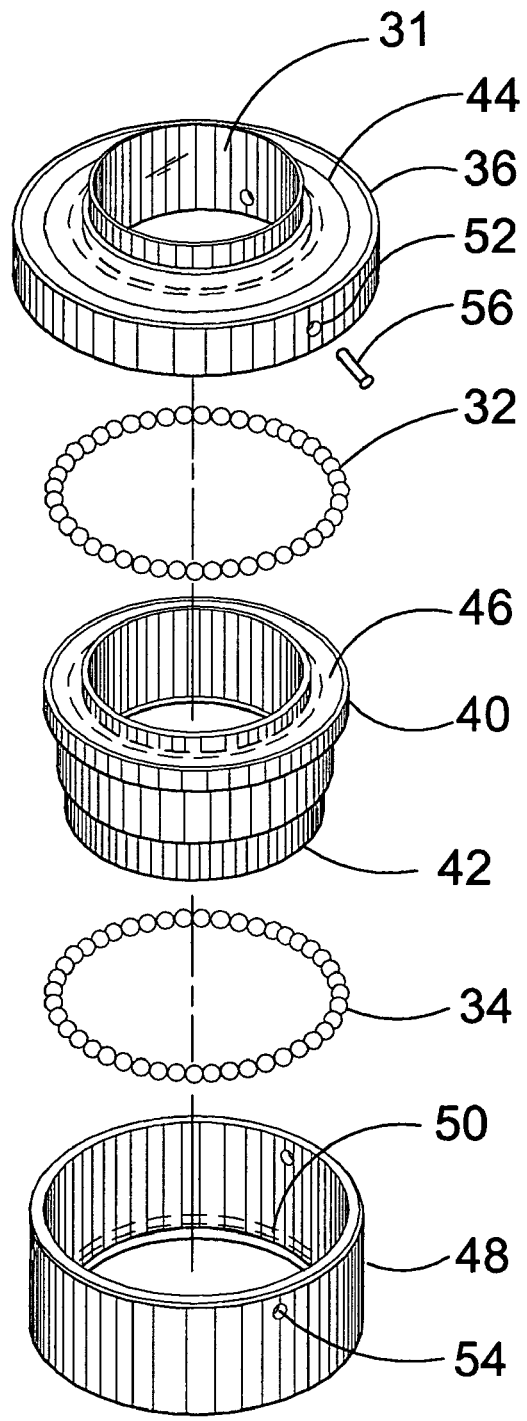
FIG. 5 is an exploded view of the dual ball bearing rotary joint of the irrigation system of the present invention.

FIG. 5 is an exploded view of the rotary joint 38 of the irrigator 10 of the present invention. The third section 48 is cylindrical in shape and includes the third raceway 50 extending around an inner periphery thereof. The second set of ball bearings 34 is positioned on the third raceway 50. The second section 40 is positioned within the third section 48 whereby the second raceway 46 is positioned atop the second set of ball bearings 34. The first set of ball bearings 32 is positioned on the second raceway 46. The first section 36 is positioned on a side of the second section 40 opposite the second set of ball bearings 34. The bottom side of the first raceway 44 rests on the first set of ball bearings 32 positioned on the second raceway 46. The first section 36 includes a recess 52 extending therethrough. The third section 48 includes a recess 54 extending therethrough and aligned with the recess 52 extending through the first section 36. A connection device 56 is positioned to extend through the recesses 52 and 54 to secure first section 36 to the third section 48. Securing the first and third sections together prevents the wine 22 that is traveling though the rotary joint 38 from leaking therefrom thereby reducing the force and pressure exerted by the wine. The connections between first, second and third sections are such that they allow the wine 22 traveling through the irrigator 10 to pass over and around the first and second set of ball bearings 32, 34. The wine passing over and around the bearings 32,34 cleans and lubricates the first and second sets of ball bearings 32,34 so that the irrigator 10 is able to rotate and thereby pivotally move the cantilevered arm 30.

Figure 6:
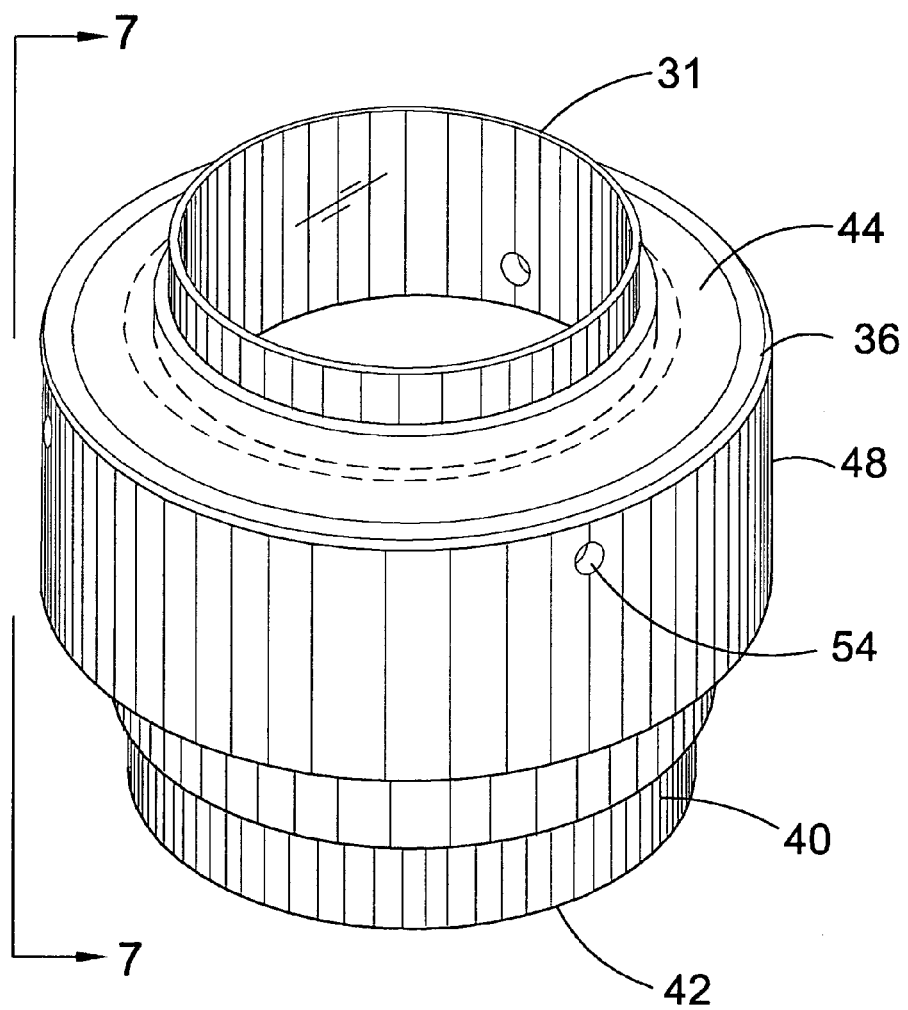
FIG. 6 is a perspective view of the rotary joint of the irrigation system of the present invention.

FIG. 6 is a perspective view of the rotary joint 38 of the irrigator 10 of the present invention. The third section 48 is cylindrical in shape and includes the third raceway 50 extending around an inner periphery thereof. The second section 40 includes a second raceway 46 extending around a periphery thereof. The second section 40 is positioned within the third section 48. The second set of ball bearings 34 is positioned atop the third raceway 50 and between the outer section and the bottom side of the second raceway 46 of the second section 40. The first section 36 includes the first raceway 44 extending around the periphery thereof. The first set of ball bearings rests on the second raceway 46 and between the first and second raceways. The first section 36 includes a recess 52 extending therethrough. The third section 48 includes a recess 54 extending therethrough and aligned with the recess 52 extending through the first section 36. A connection device 56 is positioned to extend through the recesses 52 and 54 to secure first section 36 to the third section 48. Securing the first and third sections together prevents the wine 22 that is traveling though the rotary joint 38 from leaking therefrom thereby reducing the force and pressure exerted by the wine. The connections between first, second and third sections are such that they allow the wine 22 traveling through the irrigator 10 to pass over and around the first and second set of ball bearings 32, 34. The wine passing over and around the bearings 32,34 cleans and lubricates the first and second sets of ball bearings 32,34 so that the irrigator 10 is able to rotate and thereby pivotally move the cantilevered arm 30.

Figure 7:
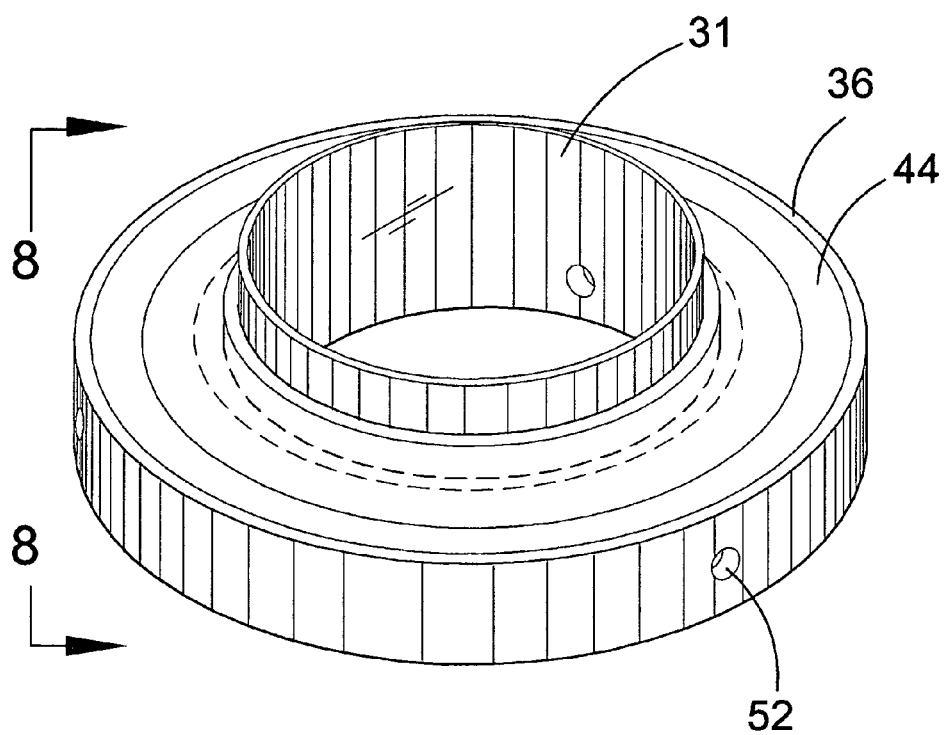
FIG. 7 is a perspective view of the first section of the irrigation system of the present invention.

FIG. 7 is a perspective view of the first section 36 of the rotary joint 38 of the present invention. The first section 36 includes the first raceway 44. Also included in the first section 36 is a recess 52. The recess 52 of the first section 36 receives a connection device 56 for connecting the first section 36 with the third section 48. The first section 36 also includes an opening 31 for connecting a supply tube 17.

Figure 8:
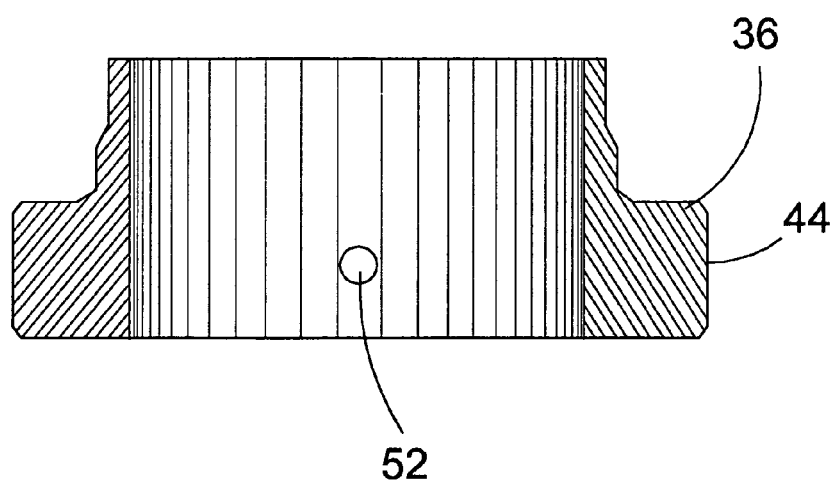
FIG. 8 is a cross-sectional view of the first section of the irrigation system of the present invention.

FIG. 8 is a cross-sectional view of the first section 36 of the rotary joint 38 of the present invention taken along line 8—8 in FIG. 7. The first section 36 includes the first raceway 44. Also included in the first section 36 is a recess 52. The recess 52 is able to receive a connection device 56 for connection of the first section 36 with the third section 48. The first section 36 also includes an opening 31 for connecting a supply tube 17 thereto.

Figure 9:
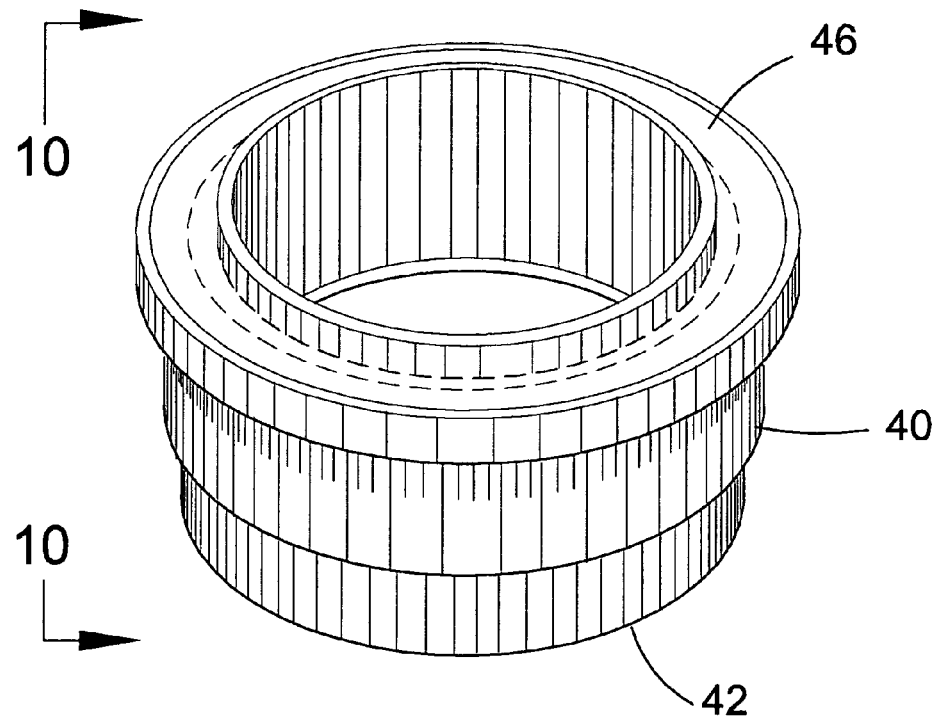
FIG. 9 is a perspective view of the second section of the irrigation system of the present invention.

FIG. 9 is a perspective view of the second section 40 of the rotary joint 38 of the present invention. The second section 40 has a second raceway 46 extending around a periphery thereof. When the rotary joint 38 is assembled a first set of ball bearings 32 (not shown) is positioned atop the second raceway 46 and the opposite side of the second raceway is positioned atop the second set of ball bearings 34 located on the third raceway 50. The second section 40 is positioned between the first section 36 and the third section 48. The second section 48 has an opening 42 for connecting a single cantilevered arm 30 thereto.

Figure 10:
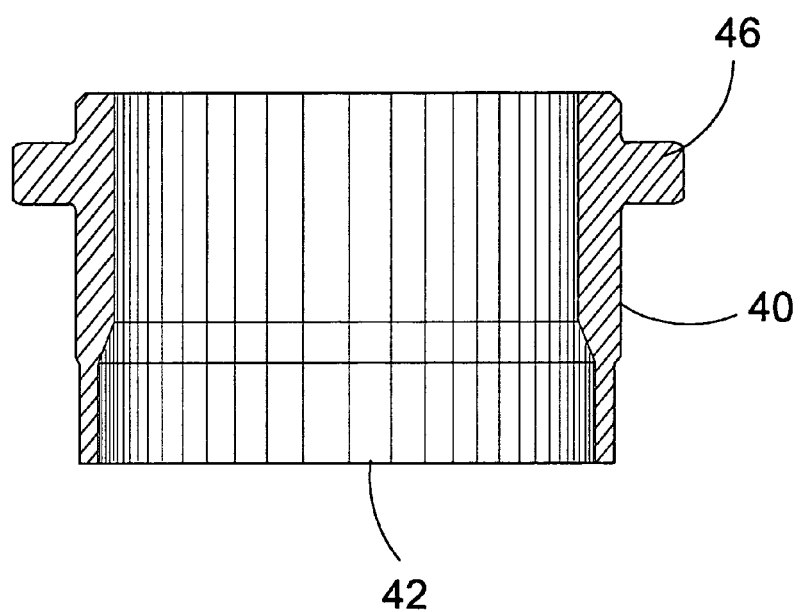
FIG. 10 is a cross-sectional view of the second section of the irrigation system of the present invention.

FIG. 10 is a cross-sectional view of the section section 40 of the rotary joint 38 taken along line 10—10 in FIG. 9. The second section 40 has a second raceway 46 extending around a periphery thereof. When the rotary joint 38 is assembled a first set of ball bearings 32 (not shown) is positioned atop the second raceway 46 and the opposite side of the second raceway is positioned atop the second set of ball bearings 34 located on the third raceway 50. The second section 40 is positioned within the third section 48 and between the first section 36 and the third section 48. The second section 48 has an opening 42 for connecting a single cantilevered arm 30 thereto.

Figure 11:
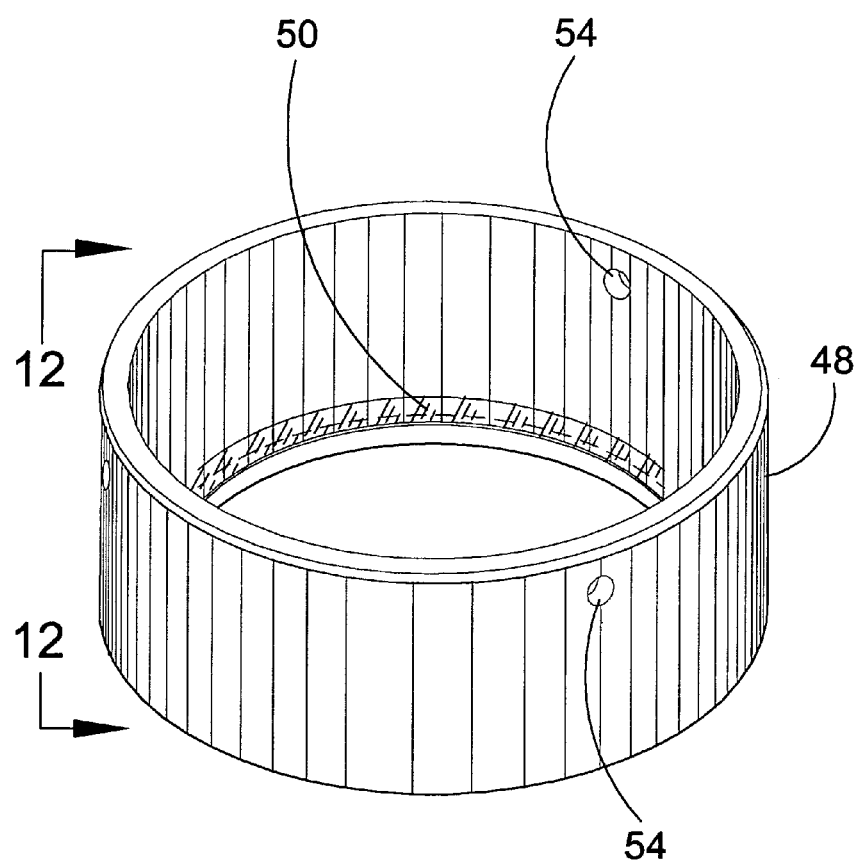
FIG. 11 is a perspective view of the third section of the irrigation system of the present invention.

FIG. 11 is a perspective view of the third section 48 of the irrigator 10 of the present invention. The third section 48 has a cylindrical shape. A third raceway 50 extends around an inner periphery thereof. When the rotary joint 38 is assembled a second set of ball bearings 34 is positioned atop the third raceway 50 and the second section 40 is received therein. The outer raceway 48 also includes a recess 54. When assembling the rotary joint 38 the recess 54 of the third section 48 is aligned with the recess 52 of the first section 36. A connection device 56 is provided to extend through recess 52 and recess 54 for connecting the third section 48 with the first section 36 and securing the second section 40 therebetween.

Figure 12:
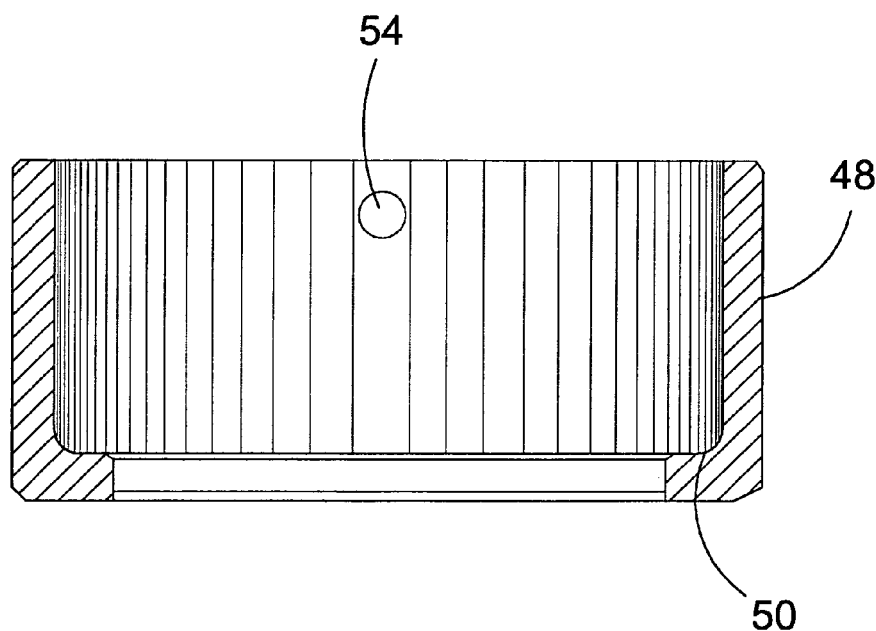
FIG. 12 is a cross-sectional view of the third section of the irrigation system of the present invention.

FIG. 12 is a cross-sectional view of the third section 48 of the rotary joint 38 taken along line 12—12 in FIG. 11. The third section 48 has a cylindrical shape. A third raceway 50 extends around an inner periphery thereof. When the rotary joint 38 is assembled a second set of ball bearings 34 is positioned atop the third raceway 50 and the second section 40 is received therein. The outer raceway 48 also includes a recess 54. When assembling the rotary joint 38 the recess 54 of the third section 48 is aligned with the recess 52 of the first section 36. A connection device 56 is provided to extend through recess 52 and recess 54 for connecting the third section 48 with the first section 36 and securing the second section 40 therebetween.

From the above description it can be seen that the irrigator 10 of the present invention is able to overcome the shortcomings of prior art irrigation systems by allowing for greater support and mobility of the liquid dispersing means in a wine fermentation tank. The two sets of ball bearings contained within the rotary joint of the irrigation system allow for the support of a cantilevered arm that thrust pivotally in an up and down direction. The irrigator having a single cantilevered arm allows for the access port of the fermentation tank to be smaller than the access ports of conventional irrigation systems. The wine passing though the rotary joint of the irrigator 10 of the present invention cleans and lubricates the two sets of ball bearings contained therein thereby prolonging the life of the rotary joint and giving the rotary joint more mobility. Further, the rotary joint is easy to manufacture and use.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:
1. A rotary joint for an irrigation system comprising:
 a) a first section having a first raceway extending around a periphery thereof;
 b) a second section having a second raceway extending around a periphery thereof;

c) an third section having a cylindrical shape for receiving said second section therein, a third raceway extending around the inner periphery thereof;
d) a first set of ball bearings positioned in said second raceway and between a bottom side of said first raceway and said second raceway;
e) a second set of ball bearings positioned on said third raceway and between a bottom side of said second raceway and said third raceway, wherein said first and third sections are secured together with said second section positioned therebetween and said rotary joint is able to maintain a single cantilevered arm connected to said second section in a balanced state, wherein said first section further includes a first recess extending through a first side thereof, said third section further includes a second recess extending through a side thereof and aligned with said first recess and said rotary joint further includes a connection device for extending through said first and second recesses and thereby securing said first and third sections together.

2. The rotary joint as recited in claim 1 wherein a liquid supplied to said system passes over and around both said first and second sets of ball bearings thereby cleaning and lubricating said first and second sets of ball bearings.

3. An irrigation system comprising:
a) a rotary joint including:
  i) a first section having a first raceway extending around a periphery thereof;
  ii) a second section having a second raceway extending around a periphery thereof;
  iii) an third section having a cylindrical shape for receiving said second section therein, a third raceway extending around the inner periphery thereof;
  iv) a first set of ball bearings positioned in said second raceway and between a bottom side of said first raceway and said second raceway;
  v) a second set of ball bearings positioned on said third raceway and between a bottom side of said second raceway and said third raceway, wherein said first and third sections are secured together with said second section positioned therebetween and said rotary joint is able to maintain a single cantilevered arm connected to said second section in a balanced state;
b) a supply tube connected to said first section for supplying a liquid thereto;
c) a single cantilever arm connected to said section, wherein said first and third sections are secured together with said second section positioned therebetween and said rotary joint is able to maintain a single cantilevered arm connected to said second section in a balanced state, wherein said first section further includes a first recess extending through a first side thereof, said third section further includes a second recess extending through a side thereof and aligned with said first recess and said rotary joint further includes a connection device for extending through said first and second recesses and thereby securing said first and third sections together.

4. The irrigation system as recited in claim 3, wherein a liquid supplied to said system passes over and around both said first and second sets of ball bearings thereby cleaning and lubricating said first and second sets of ball bearings.

5. The irrigation system as recited in claim 3, wherein said rotary joint and said single cantilevered arm are positioned within a tank and said supply line extends through an opening in said tank.

6. The irrigation system as recited in claim 5 wherein the tank includes wine therein and said wine being separated into a first cap layer, a second wine layer, and third seed layer, said supply line removing wine from said second wine layer for providing said wine to the first cap layer through said rotary joint and said single cantilevered arm.

* * * * *